United States Patent [19]

von Bonin et al.

[11] 4,380,593

[45] Apr. 19, 1983

[54] INTUMESCENT COMPOSITIONS

[75] Inventors: Wulf von Bonin, Leverkusen; Gottfried Zaby, Dormagen, both of Fed. Rep. of Germany

[73] Assignee: Bayer Aktiengesellschaft, Leverkusen, Fed. Rep. of Germany

[21] Appl. No.: 351,687

[22] Filed: Feb. 24, 1982

[30] Foreign Application Priority Data

Mar. 12, 1981 [DE] Fed. Rep. of Germany ....... 3109352

[51] Int. Cl.$^3$ ............................................. C08G 18/14
[52] U.S. Cl. ................................... 521/163; 521/165; 528/71; 528/72
[58] Field of Search .................. 521/165, 163; 528/71, 528/72

[56] References Cited

U.S. PATENT DOCUMENTS

| | | | |
|---|---|---|---|
| 3,235,517 | 2/1966 | Beck et al. | 260/2.5 |
| 3,396,129 | 8/1968 | Yeadon et al. | 260/22 |
| 4,258,141 | 3/1981 | Jarre et al. | 521/114 |
| 4,338,412 | 7/1982 | von Bonin | 521/157 |
| 4,367,295 | 1/1983 | von Bonin | 521/165 |

FOREIGN PATENT DOCUMENTS 3025217 3/1982 Fed. Rep. of Germany .
991799 5/1965 United Kingdom .

*Primary Examiner*—Maurice J. Welsh
*Attorney, Agent, or Firm*—Gene Harsh; Joseph C. Gil; Richard A. Elder

[57] ABSTRACT

Optionally-foamed intumescent compositions obtained by reacting
(a) polyisocyanates with
(b) phosphorus-containing condensation products having at least 2 hydroxyl groups and obtained by condensing primary or secondary monoamines and/or polyamines optionally containing OH-groups, carbonyl compounds and dialkyl phosphites, optionally followed by alkoxylation, and
(c) more than bifunctional polyethers having an average OH-number of from 150 to 500 which have been obtained by the addition of alkylene oxides, of which from 50 to 100% by weight consist of ethylene oxide, with low molecular weight starters, and
(d) cyanuric acid and/or cyanuric acid derivatives, and
(e) optionally water and
(f) optionally other organic compounds containing isocyanate-reactive hydrogen atoms, are used, for example, as cavity-filling, gap-sealing or coating materials.

9 Claims, No Drawings

INTUMESCENT COMPOSITIONS

BACKGROUND OF THE INVENTION

This invention relates to optionally foamed intumescent compositions based on polyurethanes which contain a combination of special polyethers, cyanuric acid derivatives and phosphorus-containing polyhydroxyl compounds as part of their formulation and which are plastic and elastic in character.

Intumescent compositions are understood to be materials which foam under the effect of fire and heat and, in doing so, form an insulating and fire-resistant foam which protects the areas situated behind it against fire. Intumescent compositions such as these are known in the form of lacquers, coatings, mortars and cements.

Good intumescent compositions should be able to at least double their volume on contact with a flame and, in addition, should be unaffected by water. It would be of particular commercial interest if these properties could be combined with the absence of halogen and a low density.

Elastic-plastic intumescent compositions characterized by high dimensional stability could be widely used in the field of fire prevention either in situ or in the form of semi-finished products, such as tape, sheeting, rolls, profiles, coatings, granulates or fillings.

The use of melamine in the production of flexible foams using substantially linear polyols, preferably polyether polyols, is known in principle (German Offenlegungsschrift No. 2,815,554). Although foams of this type are flame-resistant and are not completely consumed on exposure to a flame, they do not have the character of intumescent compositions—they do not undergo any increase in volume forming a fire repellent foam when exposed to a flame.

According to an earlier proposal (German Patent Application No. P 30 25 217.6), flame-resistant sealing compounds free from phosphorus and halogen can be produced using branched polyesters containing hydroxyl groups, but these compounds do not foam when exposed to a flame.

Another earlier proposal (German Patent Application No. P 30 25 309.9) describes optionally foamed intumescent compositions which are obtained by reacting (a) polyisocyanates with (b) phosphorus-containing condensation products having at least two hydroxyl groups which are obtained by condensing primary or secondary, aliphatic, cycloaliphatic, aromatic, araliphatic or heterocyclic monoamines and/or polyamines optionally containing OH-groups, carbonyl compounds and dialkyl phosphites, optionally followed by alkoxylation, and (c) aromatic hydroxy carboxylic acids or their salts and (d) optionally water and/or other organic compounds containing isocyanate-reactive hydrogen atoms.

According to this proposal, highly branched polyesters containing hydroxyl groups and melamine may also be used.

The products obtained according to this proposal are always rigid.

Still another earlier proposal (German Patent Application No. P 30 41 731.3) relates to optionally foamed intumescent compositions obtained by reacting polyisocyanates with phosphorus-containing condensation products having at least two hydroxyl groups obtainable by condensing primary or secondary aliphatic, cycloaliphatic, aromatic, araliphatic or heterocyclic monoamines and/or polyamines optionally containing OH-groups, carbonyl compounds and dialkyl phosphites, optionally followed by alkoxylation, with polyesters containing hydroxyl groups and having an OH-number of from 140 to 300, obtained by reacting polycarboxylic acids containing from 2 to 10 C-atoms with at least two polyols from two different groups of the following three:

(a) hydroxyl compounds containing more than three OH-groups and having a molecular weight of up to 200, (b) hydroxyl compounds containing three OH-groups and having a molecular weight of up to 150, (c) hydroxyl compounds containing two OH-groups and having a molecular weight of up to 80, wherein one polyol belongs to group (a) with cyanuric acid and/or cyanuric acid derivatives and optionally water and/or other organic compounds containing isocyanate-reactive hydrogen atoms.

The polyesters recommended are highly viscous so that reaction components characterized by relatively low viscosity are required for processibility.

Although optionally foamed intumescent compositions of this type also show the desirable properties to a satisfactory extent, there is still the fear that the polyesters used could give rise to failure in their longterm behavior when hydrolysis could occur. Because of this, there is a need that the polyester component be potentially completely or partly replaced by hydrolysis-resistant, less viscous and isocyanate-reactive materials characterized by similar service properties to those polyesters.

It has now been found that this is surprisingly possible if special polyethers with functionality greater than two and which are based on ethylene oxide and have an average OH-number of from 150 to 500 are used instead of the polyesters.

In this connection, it was surprising to find that ethylene oxide can only be replaced to a minor extent in molar terms by other alkylene oxides, such as propylene oxide, because otherwise the intumescent compositions obtained would continue to burn vigorously on exposure to a flame and would melt, i.e., would lose their intumescent properties.

DESCRIPTION OF THE INVENTION

The present invention relates to optionally foamed intumescent compositions obtained by reacting (a) polyisocyanates with (b) phosphorus-containing condensation products having at least two hydroxyl groups which have been obtained by condensing primary or secondary aliphatic, cycloaliphatic, aromatic, araliphatic or heterocyclic monoamines and/or polyamines optionally containing OH-groups, carbonyl compounds and dialkyl phosphites, optionally followed by alkoxylation, and (c) polyethers with functionality greater than two having an average OH-number of from 150 to 500 which have been obtained by the addition of alkylene oxides, of which from 50 to 100%, by weight, and preferably, 100% by weight, consist of ethylene oxide, with low molecular weight starters, and (d) cyanuric acid and/or cyanuric acid derivatives and (e) optionally water and (f) optionally other organic compounds containing isocyanate-reactive hydrogen atoms.

According to the invention, preferred intumescent compositions are obtained by reacting from 15 to 55 parts by weight of a polyisocyanate (a) from 100 parts by weight of a mixture consisting of from 10 to 45% by weight of phosphorus-containing condensation products having at least two hydroxyl groups (b), from 20 to 55% by weight of polyethers (c), from 10 to 60% by weight of cyanuric acid (derivatives) (d), and from 0 to 10% by weight of water (e) and from 0 to 25% by weight of other organic compounds containing isocyanate-reactive hydrogen atoms (f).

Particularly preferred intumescent compositions are characterized in that (i) the polyisocyanates used are polyphenylpolymethyl-polyisocyanates of the type obtained by condensing aniline with formaldehyde, followed by phosgenation, and (ii) the phosphorous-containing condensation products having at least two hydroxyl groups correspond to the formula:

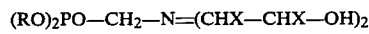

$$(RO)_2PO-CH_2-N=(CHX-CHX-OH)_2$$

wherein
R = $C_1$-$C_8$-alkyl or $C_1$-$C_8$-hydroxy alkyl and
X = H or methyl.

Particularly preferred polyethers (c) are addition products of ethylene oxide with starters of functionality equal to 3 or 4 and having OH-numbers of from 200 to 400.

The present invention also relates to the use of the new intumescent compositions for intumescent cavity-filling, gap-sealing and coating materials and to the use of these compositions by reaction in molds or by subsequent forming of the fully-reacted reaction mixtures, for the production of intumescent moldings.

Highly flexible, optionally-foamed intumescent compositions are obtained in accordance with the invention. In the case of the foamed compositions, it has also surprisingly been found that they have the character of water-resistant, plastic-elastic foamed compositions which may readily be compressed and recover only slowly, returning to their original shape. This unexpected behavior is particularly advantageous in cases where intumescent compositions of the type in question have to be introduced, without difficulty, in the form of prefabricated tapes, U-shaped profiles or other shaped articles into gaps or cavities in which they subsequently expand again and fill the gap to be sealed with all its dimensional irregularities. Additionally, these plastic, elastic or plastic-elastic intumescent compositions are of commercial interest because of their considerable resistance to water and because they may also be used for sheathing cables and lagging pipes and because their effectiveness is not in any way impaired by vibration.

The soft, flexible intumescent compositions obtainable in accordance with the invention are by nature flame-resistant without any need for halogen compounds to be used. On exposure to a flame, they foam to ten times their original volume and, in doing so, form a fire-repellent foam which screens off the areas behind it from the flame.

They may also be thermoplastically processed in the vicinity, but generally below, their foaming temperatures. Providing the temperature prevailing during thermoplastic processing (for example, by molding or extrusion) into moldings is suitably controlled, the moldings obtained may be foamed or solid in character. The thermoplastic behavior of the compositions under certain processing conditions may also be used for modifying moldings (for example, sheets of foamed material) for separating or welding to other materials or even for stamping or permanent deformation.

On exposure to a flame, the intumescent compositions according to the invention surprisingly foam to a far greater extent than the compositions obtainable in accordance with German Patent Application No. P 30 41 731.3. This may be regarded as a distinct advantage, for example, in the case of sealing lips.

The new intumescent materials may be produced either continuously or in batches. Production may be carried out by mixing the components in situ or by pouring an already premixed component mixture, under pressure or in the absence of pressure, for example, into openings to be closed or into heated or unheated molds where they subsequently foam and harden. They may be sprayed, coated or cast onto the substrate to be protected providing they have been suitably treated. It is also possible initially to convert the reaction mixtures according to the invention into semi-finished products, for example, foams, profiles or coatings, and then to further process these semi-finished products in the manner required, for example, by cutting, by thermoforming, by granulation, grinding or mixing, or by coating and bonding.

By combining the reaction mixture with foamed or solid inorganic or organic additives, such as, for example, polystyrene foam, polyurethane foam, phenoplasts, aminoplasts, gravel or expanded clay, urea or phenolic resin foams, foamed glass, glass fibers, wood, mineral wool, pumice, or other materials it is also possible to obtain composite materials characterized by special intumescent properties. The intumescent compositions according to the invention may also be used for the production of moldings reinforced by fibers or wires and woven fabrics, strands or mats of organic or inorganic materials or as a constituent of multiple-layer or sandwich-type materials. They may also be combined with other organic or inorganic intumescent materials.

Suitable fillers, which may be used individually or in combination, are, in particular, aluminum oxide hydrates, chalk, kaolin, glass and solid and hollow beads of silicate-based material, for example, so-called microballoons. In addition to hollow beads, it is preferred to use aluminum oxide hydrates by virtue of their dehydratability.

The following materials are used for carrying out the process according to the invention:

(a) As starting components, aliphatic, cycloaliphatic, araliphatic, aromatic and heterocyclic polyisocyanates of the type described for example by W. Siefken in Justus Liebigs Annalen der Chemie, 562, pages 75 to 136 are used. Polyisocyanates corresponding to the formula $Q(NCO)_n$ in which n = 2–4 (preferably 2) and Q represents an aliphatic hydrocarbon radical containing from 2 to 18 and preferably from 6 to 10 carbon atoms; a cycloaliphatic hydrocarbon radical containing from 4 to 15 and preferably from 5 to 10 carbon atoms; an aromatic hydrocarbon radical containing from 6 to 15 and preferably from 6 to 13 carbon atoms; or an araliphatic hydrocarbon radical containing from 8 to 15 and preferably from 8 to 13 carbon atoms may be used.

Examples of these polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (German Auslegeschrift No. 1,202,785, U.S. Pat. No. 3,401,190). Further examples include 2,4- and 2,6-hexahydrotolylene diisocyanate and mixtures of these isomers, hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate, naphthylene-1,5-diisocyanate.

According to the invention, it is also possible, for example, to use triphenyl methane-4,4',4"-triisocyanate; polyphenyl polymethylene polyisocyanates of the type obtained by condensing aniline with formaldehyde, followed by phosgenation, and described, for example, in British Pat. Nos. 874,430 and 848,671; m- and p-isocyanatophenyl sulphonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and in German Offenlegungsschrift Nos. 2,504,400; 2,537,685 and 2,552,350. Additional examples include norbornane diisocyanates according to U.S. Pat. No. 3,492,330; polyisocyanates containing allophanate groups of the type described, for example, in British Pat. No. 994,890, in Belgian Pat. No. 761,626 and in Dutch Patent Application No. 7,102,524; polyisocyanates containing isocyanurate groups of the type described, for example, in U.S. Pat. No. 3,001,973, in German Pat. Nos. 1,002,789; 1,222,067 and 1,027,394 and in German Offenlegungsschrift Nos. 1,929,034 and 2,004,048; polyisocyanates containing urethane groups of the type described, for example, in Belgian Pat. No. 752,261 or in U.S. Pat. Nos. 3,394,164 and 3,644,457. Still further examples include polyisocyanates containing acylated urea groups according to German Pat. No. 1,230,778; polyisocyanates containing biuret groups of the type described, for example, in U.S. Pat. Nos. 3,124,605 and 3,201,372 and in British Pat. No. 889,050; polyisocyanates produced by telomerization reactions of the type described, for example, in U.S. Pat. No. 3,654,106; polyisocyanates containing ester groups of the type described, for example, in British Patent Nos. 965,474 and 1,072,956, in U.S. Pat. No. 3,567,763 and in German Pat. No. 1,231,688; reaction products of the above-mentioned isocyanates with acetals according to German Pat. No. 1,072,385; and polyisocyanates containing polymeric fatty acid esters according to U.S. Pat. No. 3,455,883.

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates.

In general, it is particularly preferred to use the commercially readily-available polyisocyanates, for example, 2,4- and 2,6-tolylene diisocyanate, also any mixtures of these isomers ("TDI"), but particularly polyphenyl polymethylene polyisocyanates of the type obtained by condensing aniline with formaldehyde, followed by phosgenation ("crude MDI"). In addition, polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate are also particularly preferred.

(b) Phosphorus-containing condensation products having at least two hydroxyl groups of the type which can be obtained, for example, by condensing primary or secondary aliphatic, cycloaliphatic, aromatic, araliphatic or heterocyclic monoamines and/or polyamines optionally containing OH-groups, carbonyl compounds and dialkyl phosphites, optionally followed by alkoxylation are used. Condensation products such as these are known, for example, from German Pat. No. 1,143,022, U.S. Pat. No. 3,076,010, German Auslegeschrift No. 1,803,747 and German Auslegeschrift No. 1,928,265.

According to the invention, preferred phosphorus-containing condensation products having at least two hydroxyl groups correspond to the formula:

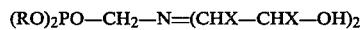

wherein
R=$C_1$–$C_8$-alkyl or $C_1$–$C_8$-hydroxylalkyl, preferably ethyl or hydroxy ethyl, and
X=H or methyl, preferably H.

(c) Polyethers with functionality greater than 2, having an average OH-number of from 150 to 500 and obtained by the addition of alkylene oxides, of which from 50 to 100% by weight consist of ethylene oxide, with Zerewitinow-active low molecular weight starters are used. Polyethers having OH-numbers of from about 200 to 400 are particularly preferred.

In the context of the invention, "functionality greater than 2" means that bifunctional polyethers may also be present in admixture with trifunctional and/or higher polyethers. An average functionality of from 2.5 to 4 is preferred.

Although ethylene oxide addition products are preferably used as the polyethers in accordance with the invention, it is also possible, in principle, to replace up to about 50% by weight of the ethylene oxide by propylene oxide or other alkylene oxides. This is likely, however, to have an adverse effect upon the intumescent properties and behavior of the intumescent compositions on exposure to a flame, and it is, therefore, less preferred to use polyethers in which other alkylene oxides, for example, propylene oxide, may be used in addition to ethylene oxide.

The polyethers are produced by methods commonly used in polyether chemistry.

Suitable low molecular weight starters are the compounds known for the production of polyethers—for example, water, ethylene glycol, propylene glycol, butane diol, trimethylol propane, glycerol, triethanolamine, pentaerythritol, ethylene diamine, tolylene diamines, a variety of different sugars and their hydrogenation products, formoses and formitols, aniline, polyalkylene polyamines, benzidines and their hydrogenation products, aniline-formaldehyde condensates and their hydrogenation products. Aliphatic and aromatic polycarboxylic acids may also be used as starters, as may amino-acids or amino-alcohols, such as ethanolamine.

(d) Cyanuric acid and/or its derivatives, i.e., cyanuric acid or compounds which may be interpreted as cyanuric acid or isocyanic acid derivatives. Such compounds include, for example, cyanamide, dicyanamide, dicyanodiamide, guanidine and its salts, biguanide, urazole, urazole cyanurate, melamine cyanurate, cyanuric acid salts and cyanuric acid esters and amides, particularly melamine, which is preferred by virtue of its ready availability.

In the context of the invention, melamine is preferably understood to be the parent substance 2,4,6-triamino-s-triazine, although it is also possible, for example, to use its condensation products obtained by heat treatment or by reaction with formaldehyde.

(e) Optionally water and (f) optionally other organic compounds containing isocyanate-reactive hydrogen atoms. These include:

(i) compounds containing at least two isocyanate-reactive hydrogen atoms and having a molecular weight in the range of from 400 to 10,000. In addition to compounds containing amino groups, thiol groups or carboxyl groups, compounds containing hydroxyl groups, particularly compounds containing from 2 to 8 hydroxyl groups, above all those having molecular weights of from 1000 to 6000 and preferably from 1000 to 3000 are preferred. Examples of these include polyesters, polyethers (other than those mentioned in (c)), polythioethers, polyacetals, polycarbonates and polyester amides containing at least 2, generally 2 to 8, but preferably 2 to 4 hydroxyl groups, of the type known for the production of non-cellular and cellular polyurethanes.

The polyesters containing hydroxyl groups suitable for use in accordance with the invention are, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example, by halogen atoms, and/or may be unsaturated.

Examples of carboxylic acids such as these and their derivatives include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, and tetrachlorophthalic acid anhydride. Additional examples include endomethylene tetrahydrophthalic acid anhydride; glutaric acid anhydride; maleic acid; maleic acid anhydride; fumaric acid; and dimerized and trimerized unsaturated fatty acids, optionally in admixture with monomeric unsaturated fatty acids, such as oleic acid, terephthalic acid dimethyl ester and terephthalic acid bis-glycol ester. Examples of suitable polyhydric alcohols include ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol and 1,2,4-butane triol. Additional suitable polyhydric alcohols include trimethylol ethane, pentaerythritol, quinitol, mannitol and sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols.

The resulting polyesters may contain terminal carboxyl groups and polyesters of lactones, for example, ε-caprolactone, or of hydroxy carboxylic acids, for example, ω-hydroxy caproic acid, may also be used.

Polyethers containing at least two, generally from 2 to 8, and preferably 2 or 3, hydroxyl groups which are suitable for use in accordance with the invention, other than those mentioned in (c), are also known. These polyethers are obtained, for example, by polymerizing epoxides, such as ethylene oxide, propylene oxide, butylene oxide, tetrahydrofuran, styrene oxide or epichlorohydrin on their own, for example in the presence of Lewis catalysts, such as $BF_3$, or by the addition of these epoxides, preferably ethylene oxide and propylene oxide, optionally in admixture or successively, with starter components containing reactive hydrogen atoms, such as water, alcohols, ammonia or amines. Sucrose polyethers of the type described, for example, in German Auslegeschrift Nos. 1,176,358 and 1,064,938 and formitol or formose-started polyethers as described, for example, in German Offenlegungsschrift No. 2,639,083 and 2,737,951, may also be used in accordance with the invention.

Representatives of the above-mentioned compounds are described for example in *High Polymers*, Vol. XVI, *Polyurethanes, Chemistry and Technology*, by Saunders-Frisch, Interscience Publishers, New York/London, Vol. I, 1962, pages 32 to 42 and pages 44 to 54, and Vol. II, 1964, pages 5–6 and 198–199, and in *Kunststoff-Handbuch*, Vol. VII, Vieweg-Hochtlen, Carl-Hanser-Verlag, Munich, 1966, for example, on pages 45 to 71. It is, of course, possible to use mixtures of the above-mentioned compounds containing at least two isocyanate-reactive hydrogen atoms and having a molecular weight in the range from 400 to 10,000, for example, mixtures of polyethers and polyesters.

(ii) Compounds containing at least two isocyanate-reactive hydrogen atoms and having a molecular weight in the range of from 32 to 400 which may be used alone or in mixtures of various other compounds with these properties. In this case, too, the compounds in question are compounds containing hydroxyl groups and/or amino groups and/or thiol groups and/or carboxyl groups, preferably compounds containing hydroxyl groups and/or amino groups, which serve as chain extenders or crosslinkers. These compounds generally contain from 2 to 8 and preferably from 2 to 4 isocyanate-reactive hydrogen atoms.

Examples of such compounds include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol and sorbitol and castor oil. Additional examples include diethylene glycol, triethylene glycol, tetraethylene glycol, higher polyethylene glycols having a molecular weight of up to 400, dipropylene glycol and higher polypropylene glycols having a molecular weight of up to 400, dibutylene glycol and higher polybutlyene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

(iii) Other low molecular weight polyols suitable for use in accordance with the invention are e.g. the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084; 2,714,084; 2,714,104; 2,721,186; 2,738,154 and 2,738,512). To obtain plastics having improved flame resistance, these formoses are advantageously used in combination with aminoplast formers and/or phosphites (German Offenlegungsschrift Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as polyol component in accordance with the invention (German Offenlegungsschrift No. 2,638,759). Aliphatic diamines suitable for use in accordance with the invention are, for example, ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methylamine, diamino-perhydroanthracenes (German Offenlegungsschrift No. 2,638,731) and cycloaliphatic triamines according to German Offenlegungsschrift No. 2,614,244. According to the invention, it is also possible to use hydrazine and substituted hydrazines, for example, methyl hydrazine, N,N'-dimethylhydrazine and their homologs, as well as acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Additionally, semicarbazido-alkylene-hydrazides such as, for example, β-semicarbazido-propionic acid hydrazide (German Offenlegungsschrift No. 1,770,591), semicarbazido-alkylene-carbazinic esters such as, for example, 2-semicarbazidoethyl-carbazinic ester (German Offenlegungsschrift No. 1,918,504), or even amino-semicarbazide compounds such as, for example, β-aminoethylsemicarbazido-carbonate (German Offenlegungsschrift No. 1,902,931) may also be used. To control their reactivity, the amino groups may be completely or partly blocked by aldimine or ketimine groups (U.S. Pat. No. 3,734,894; German Offenlegungsschrift No. 2,637,115).

Suitable aromatic diamines are the bis-anthranilic acid esters according to German Offenlegungsschrift Nos. 2,040,644 and 2,160,590; the 3,5- and 2,4-diamino benzoic acid esters according to German Offenlegungsschrift No. 2,025,900; and the diamines containing ester groups described in German Offenlegungsschrift Nos. 1,803,635 (U.S. Pat. Nos. 3,681,290 and 3,736,350), 2,040,650 and 2,160,589. Additional examples include the diamines containing ether groups according to German Offenlegungsschrift Nos. 1,770,525 and 1,809,172 (U.S. Pat. Nos. 3,654,364 and 3,736,295); 2-halogen-1,3-phenylene diamines optionally substituted in the 5-position (German Offenlegungsschrift Nos. 2,001,772; 2,025,896 and 2,065,869); 3,3'-dichloro-4,4'-diaminodiphenyl methane, tolylene diamine; and 4,4'-diaminodiphenyl methane.

Although the groups (f) reaction components may indeed be used, the potential disadvantages which their use involves in terms of behavior on exposure to a flame should be taken into consideration in each individual case.

It has been found that the standard stoichiometric ratios in conventional polyurethane chemistry do not lead to the advantageous properties of the new intumescent compositions, particularly the intumescent foams. Instead, components (b), (c), (d) and optionally (e) are combined irrespective of the stoichiometry normally required in isocyanate chemistry. The mixture thus obtained is reacted in simple preliminary tests with different quantities of the polyisocyanate lying within a range laid down in accordance with the invention in order, empirically, to determine the optimal activity required.

The approximate quantities thus determined for the individual components (b), (c), (d) and optionally (e) and (f) in the reaction mixture to be reacted with the polyisocyanate add up to 100% and amount to between 10 and 45%, by weight, and preferably to between 15 and 35% by weight, for the phosphorus-containing condensation products having at least two hydroxyl groups (b):

to between 20 and 55%, by weight, and preferably to between 25 and 45%, by weight, for the polyhydroxyl compounds (c):

to between 10 and 60%, by weight, and preferably to between 20 and 50%, by weight, for the cyanuric acid derivatives (d):

to between 0 and 10%, by weight, and preferably to between 0 and 5%, by weight, for water (e):

to between 0 and 25%, by weight, and preferably to between 0 and 15%, by weight, for the other organic compounds containing isocyanate-reactive hydrogen atoms (f).

In general, 100 parts, by weight, of this reaction mixture are reacted with from 15 to 55 parts, by weight, and preferably with from 25 to 45 parts, by weight, of the polyisocyanate.

Production of the intumescent compositions may be carried out in a solvent, although it is preferably carried out in the absence of solvents.

The reaction mixtures leading to the intumescent compositions according to the invention may be produced and processed continuously or in batches.

The various reaction components may be individually combined. However, it is best to prepare a preliminary mixture from the polyisocyanate-reactive components (b), (c), (d) (and, optionally, component (e)) which creates a liquid reaction component in which all the necessary constituents except for the polyisocyanate are present, optionally after brief heating. In this way, the intumescent compositions according to the invention may be formulated as a two-component mixture. This two-component processing is normally done, for example in hand-stirred or mechanically-stirred vessels, in stirrer-equipped or jet-type mixing heads or in static mixers, of the types commonly used in polyurethane chemistry. The reaction may be completed in cooled, cold or heated molds under pressure or in the absence of pressure.

Further components such as, for example, urea, urea condensates, formaldehyde condensates, phenolic resins, phosphates, aminopolyphosphates, phosphoric acid esters, for example, tricresyl phosphate or dibutyl cresyl phosphate, aluminum oxide hydrates, glass powders, Vermiculite, solid or hollow glass or other silicate beads and other additives which modify burning properties, may readily be added to the preliminary mixture of components and, optionally, even to the isocyanate.

Foams are of particular interest. They may have densities of from about 40 to 900 kg/m$^3$, and preferably from 80 to 600 kg/m$^3$. A particularly well-balanced combination between low density, which is required for reasons of insulation capacity, and mass per unit volume, required for the foaming effect on contact with a flame, is represented by foams obtainable in accordance with the invention having densities of from about 150 to 600 kg/m$^3$.

Surprisingly it is not necessary in the production of the foamed intumescent compositions according to the invention to use catalysts for the foam-forming reaction or other auxiliaries of the type otherwise normally used in the chemistry of foams, i.e., even additional gaseous or low-boiling blowing agents or compounds which give off blowing gases. In individual cases, it is possible, of course, to use additional aids of this kind, as well as emulsifying, foam-stabilizing, separating, coloring, preserving, hydrolysis-inhibiting, odoriferous or other additives as part of the formulation. For example, the use of catalysts which give rise to carbodiimide formation of the type known, for example, in the class of phospholine oxides, such as, for example, 1-methyl-1-oxophospholine oxides, leads to intumescent compositions characterized by improved resistance to hydrolysis.

It is also possible to include in the formulation of the intumescent compositions according to the invention additives of the type which are capable of helping to increase foaming in the event of contact with a flame. Additives of this type are, for example, aliphatic and, in particular, aromatic hydroxy carboxylic acids, such as salicylic acid or p-hydroxy benzoic acid, PVC, carbohydrates or compounds which give off water, nitrogen or $CO_2$ at elevated temperature, such as triazoles, azodicarbonamides, sulfohydrazides or urea-dicarboxylic acid anhydride.

It is also possible, for example, to foam shaped articles from the intumescent compositions or even granulates differing widely in grain size in one or more stages by heating them (by radiation, by treatment with superheated steam or hot air or other hot gases, by microwaves or high-frequency or by thermal conduction in air or liquid baths or metal baths) to temperatures above 200° C. and preferably to temperatures in the range from 250° to 1800° C., more particularly in the range from 300° to 800° C. Foaming may be carried out freely or in closed or open molds, in which case the molds are best provided with openings for the escape of air and vapors. Fire-repellent foams—so-called carbonizing foams—are formed in this case.

The intumescent compositions according to the invention may be applied to support materials and foamed thereon, for example, by coating expanded clay particles then pouring them into a mold and heating them therein, resulting in the formation of a block of expanded clay embedded in carbonizing foam. A correspondingly coated sheet of wood or iron may be processed at around 250° C. to form a composite foam sheet. In this case, the surface of the foam may be covered by another sheet of wood or iron.

The intumescent compositions according to the invention may also be used for filling cavities with foam, for example, in cable ducts, and also in clay bricks and other building materials, which may be done, for example, by introducing the reaction mixtures or completed intumescent foams in a suitable quantity into the cavity of the cold or still warm brick.

The intumescent compositions according to the invention may also be used for insulating pipes and cables in the form of half-shells or complete jackets. It is of advantage in this respect that insulation may also be carried out in situ by coating the pipe or pipe section to be insulated with the reaction mixture and subsequently foaming the mixture.

The intumescent compositions according to the invention may be converted, for example, by incorporation into or knife-coating onto textiles of organic or inorganic fibers and, by spraying, molding or casting and gelation, or by cutting or melting, into shaped articles or coatings which foam at temperatures in the range from about 200° to 350° C., preventing flame propagation, and making them suitable for use as sealing elements, safety devices and fire barriers. Gaps may be filled and cable and masonary openings sealed with them by, for example, using a type of concrete produced from the intumescent composition and stones and/or expanded particles, such as expanded clay, expanded glass, Vermiculite, Perlite and the like and/or even foam beads based, for example, on polystyrene. It is also of advantage to produce fire-preventing upholstery coverings and textile coverings using the new, flexible intumescent compositions.

Optionally-reinforced coatings of virtually any thickness on metal (for example, steel girders and panels), wood (for example door panels and roof beams), masonary, or plastics (whether cable insulations or foam sheeting) may be produced with these compositions by applying the coatings to a loadbearing panel or supporting structure (for example, to an expanded metal panel, to a honeycomb panel of metal, cardboard, paper, wood, ceramics or plastics, or to fire-retarding panels or wall elements). The intumescent compositions are also of interest for the production of anti-vibration coatings or noise-insulating elements and also for energy-absorbing purposes.

The intumescent compositions according to the invention may also be used for lining the interior of fire-retarding doors with a coating which foams in the event of fire and has an insulating effect. They may also be used for the production of door and other seals which foam in the event of fire and seal off the gap in front of them. Sealing profiles, (for example, of elastic material) may also be filled or back-filled with the intumescent compositions according to the invention to obtain fire-retarding seal.

By suitable arrangement, it is possible to build in chimneys, ventilation and conditioning installations, pipes and inlet/outlet openings, barriers which, if heated to around 200° to 400° C., retard or prevent the further passage of gases. Arrangements such as these are, for example, stacks of screens or perforated plates coated with the intumescent compositions and arranged parallel to one another at narrow intervals or pipe sections loosely filled with granulates of the intumescent compositions. The optionally foamed intumescent compositions may also be used as filter elements for gases which block further flow in the event of extensive increase in temperature.

The following examples are intended to illustrate the invention and to illustrate the connection between the formulation and the properties of the intumescent compositions obtainable in accordance with the invention without limiting the invention in any way. The parts quoted represent parts by weight and/or percentages by weight, unless otherwise indicated.

The starting materials used include: As the polyisocyanate (a), a standard commercial polyisocyanate isomer mixture (NCO content 30–32% b.w.) obtained by phosgenating aniline-formaldehyde condensates and containing approximately 90% of binuclear diisocyanates and approximately 10% of polynuclear polyisocyanates;

As the phosphorus-containing condensation product (b), technical-quality $(C_2H_5O)_2PO.CH_2$—$(NC_2H_4OH)_2$, referred to here as "P-diol";

The polyethers (c) used are as follows:

(C1) addition product of ethylene oxide with glycerol, OH-number 254;

(C2) addition product of ethylene oxide with glycerol, OH-number 200;

(C3) addition product of ethylene oxide with trimethylol propane, OH-number 150;

(C4) addition product of ethylene oxide with glycol, OH-number 172;

(C5) addition product of a mixture of 40% by weight of propylene oxide and 60% by weight of ethylene oxide with o-tolamine, OH-number 430;

(C6) addition product of propylene oxide with glycerol, OH-number 255;

(C7) addition product of 40%, by weight, of propylene oxide and 60%, by weight, of ethylene oxide with a mixture of equal parts of glycerol and propylene glycol, OH-number 26;

(C8) addition product of ethylene oxide with triethanolamine, OH-number 230; and The cyanuric acid derivatives (d) used are dicyanodiamide (referred to here as "dd") and melamine (referred to here as "dm").

EXAMPLE 1

A mixture is prepared from 37.5 parts of melamine (dm), 0.8 part of water, 39 parts of polyether (C1) and 22.7 parts of P-diol. The polyisocyanate is stirred into this mixture at room temperature in quantities of 36 parts.

Foaming begins after about 40 seconds, resulting in the formation of a flexible foam characterized by a regular, relatively coarse cell structure, outstanding stability and a unit weight of approximately 180 kg/m$^3$.

The test produces a similar result when the polyisocyanate and the reaction mixture are simultaneously pumped to a stirrer-equipped mixing head and intensively mixed therein. The reacting mixture leaves the mixing head through a nozzle and is deposited onto a conveyor belt on which it subsequently foams. An intumescent foam is continuously obtained in this way.

The foam thus-produced is exposed to a Bunsen flame in the form of a cube having an edge length of 2 cm placed on a supporting plate. The foam begins to carbonize and, at the same time, foams to a considerable extent. Foaming is directed opposite to the flame. When the flame is removed, the sample stops burning.

An identical sample is stored for 5 days in 500 ml of water at room temperature, rinsed and dried. It shows equally good intumescent behavior in the flame test. Another sample is stored for 5 days at 120° C. and then tested. It shows equally good intumescent behavior in the flame test. There is no sign of any after-burning.

EXAMPLE 2

The procedure is as in Example 1, except that the melamine is replaced by dicyanodiamide (dd). A foam having a density of 200 kg/m$^3$ is obtained, foaming to an even greater extent than the foam of Example 1 in the flame test.

EXAMPLE 3

The procedure is as in Example 1, except that the water is left out. A rubber-like, but still porous material is obtained, its density being of the order of 600 kg/m$^3$. It is not tacky.

The same reaction mixture is introduced in freshly prepared form into a plate mold in which it hardens between Teflon-coated metal walls to form a composite plate measuring $10 \times 10 \times 1$ cm. A semi-finished product with a smooth, stable outer skin suitable for the production of sealing elements is obtained in this way.

If this plate is exposed to a Bunsen flame, no afterburning is observed after removal of the flame at various stages of the test. A layer of carbonizing foam extending clearly towards the flame source is formed in the flame zone, preventing the flames from spreading to the regions of the workpiece situated behind it.

If the reaction mixture is poured into a $20 \times 20$ cm opening in a 10 cm thick foam concrete wall, and if the test specimen thus formed is tested in a small fire chamber which is equipped with an oil burner and which reaches an internal temperature of 900° C. after 50 minutes, the opening thus filled withstands the flame for more than 90 minutes. A temperature of the order of 40° C. is measured on the outside in the meantime. That side of the opening facing the flame is filled with an insulating carbonizing foam.

EXAMPLE 4

The procedure is as in Example 1, except that 42 parts of polyisocyanate are used. The foam formed has a density of 220 kg/m$^3$ and is distinguished by greater rigidity than the foam of Example 1 although it is still flexible and equally flame resistant.

EXAMPLE 5

The procedure is as in Example 1 using the 39 parts of polyether (C2). A foam having a density of 175 kg/m$^3$ and substantially the same flexibility as the Example 1 foam is obtained. The flame test according to Example 1 shows that the foam has equally good intumescent properties when compared with the foam produced in Example 1. There are no signs of any after-burning.

EXAMPLE 6

The procedure is as in Example 1, except that polyether (C1) is replaced by the same quantity of a mixture of equal parts of polyethers (C1) and (C3). The foam obtained has a unit weight of 190 kg/m$^3$. In the flame test, it behaves in the same way as the foam obtained in accordance with Example 1.

EXAMPLE 7

The procedure is as in Example 1, except that 6 parts of polyether (C4) dissolved, with heating, in 39 parts polyether (C1) are additionally used. The foam obtained is no different either in its appearance or in its flame resistance from the material obtained in accordance with Example 1.

EXAMPLE 8

This Example is intended to demonstrate how the use of propylene oxide in the production of the polyether adversely affects the properties of the end product.

The procedure is as described in Example 1, except that quantities of 20, 40, 60, 80 and 100% of the polyether (C1) are replaced by polyether (C6).

In the first place, it was found that the foams obtained in this series are increasingly less stable and show a tendency to shrink. The flame test shows that, even with 20% of polyether (C6), less foaming takes place in the flame, the foam beginning to melt in the flame. Up to a content of around 40% of polyether (C6), there is no sign of any after-burning coupled with a decreasing tendency to form carbonizing foam in the flame. With an increasing content of polyether (C6), there is an increasing tendency for the foam to melt away in the flame and to continue burning. The foam produced with 100% polyether (C6) completely melts away in the flame and continues to burn vigorously. Beyond a content of polyether (C6) of the order of 45%, the products obtained are no longer suitable for use as intumescent compositions.

EXAMPLE 9

This Example is intended to illustrate the adverse effect of polyethers which not only have propylene oxide incorporated in them, but also have OH-numbers lying beyond the limits indicated in accordance with the invention.

The procedure is as in Example 1, except that 10% and 20% of polyether (C1) are replaced by polyether (C7). Flexible foams having densities of the order of 300 kg/m$^3$ are obtained. Only slight foaming is observed in the flame test, whereas on the other hand the foam containing only 10% of polyether (C7) continues burning vigorously for more than 10 seconds while the foam containing 20% of polyether (C7) continues burning for several minutes after removal of the flame in the flame test. In both cases, the foams are unsuitable for use as intumescent compositions.

EXAMPLE 10

The procedure is as in Example 1, except that 40% of polyether (C1) is replaced by polyether (C5), in addition to which 42 parts of polyisocyanate are used. A stable foam having a density of 260 kg/m$^3$ and characterized by high flexibility is obtained. Although the foam shows excellent intumescent behavior in the flame test, it does continue burning after removal of the flame, but for less than 5 seconds. This intumescent material may be regarded as just suitable.

EXAMPLE 11

The procedure is as in Example 1, except that polyether (C1) is replaced by the same quantity of polyether (C8). A stable foam having a density of the order of 300 kg/m$^3$ is obtained. Particularly distinct intumescent behavior is observed in the flame test. There is no sign of any after-burning.

EXAMPLE 12

The procedure is as in Example 1, except that no water is used. The reaction mixture is hardened in a plate mold, resulting in the formation of a rubber-like, slightly porous material having high flexibility. Sealing strips are cut out from the plate. If these sealing strips are built into a door frame as a sealing element, protecting the door gap against the entry of air, vigorous foaming occurs when the door frame is exposed to a flame, protecting the door gap against the entry of heat and flame gases. In addition to outstanding foaming in the flame, the semi-finished plate does not itself show any signs of after-burning.

EXAMPLE 13

The reaction mixture obtainable in accordance with Example 1 is introduced into a conically shaped trough mold of polyethylene in which it is foamed and hardened. A V-shaped foam profile is formed which is easy to remove from the mold and which has a cross-section of 1.8 cm at its peak and a cross-section of 2.5 cm at its base for a height of 4.5 cm.

This profile tape is pressed into a 2 cm wide, 14 cm deep masonary gap from both sides until the gap is completely filled. A sample having a gap length of 40 cm is exposed both horizontally and also vertically to a fire test in the small fire chamber used in Example 3. After 90 minutes, the temperature of the gap is still below 80° C., as measured on the surface of that side of the gap-filling material remote from the fire (i.e., on the outer surface of the test specimen). The gap remains protected against the diffusion of heat and flame gases.

EXAMPLE 14

The procedure is as in Example 13, except that the intumescent materials obtainable in accordance with Examples 4 and 11 are used. In both cases, the same satisfactory results as in Example 13 are observed.

EXAMPLE 15

1 cm thick and 9 cm wide strips are cut from the flexible intumescent material obtainable in accordance with Examples 3 and 12. The strips are bent parallel to their longitudinal axis into a V-shaped cross-section and are pressed in this form into a 3 cm wide masonary gap. The recovery forces of the material cause the gap to be filled and sealed at the same time. In the fire chamber test according to Example 13, the gap thus filled withstands the penetration of heat and flame gases for more than 90 minutes.

EXAMPLE 16

12 parts of melamine, 0.5 part of water and, 14.5 parts of P-diol are thoroughly mixed with 25 parts of a polyether having an OH-number of 399 which has been obtained by the addition of ethylene oxide with ethylene diamine. The mixture thus prepared is delivered to a stirrer-equipped mixing head in which it is mixed with 25 parts of the polyisocyanate and the resulting mixture is immediately applied to a moving belt. After a few seconds, a foam is formed on the belt, hardening after about 70 seconds. The foam thus-formed has a density of the order of 190 kg/m$^3$.

There are no signs of any afterburning in the flame test. The foam undergoes an increase in volume of more than 300% in the flame to form a fine-pored, fire-repellent carbonizing foam.

EXAMPLE 17

The procedure is as in Example 16, except that 20 parts of a mixture of equal parts of the polyisocyanate used in that example and of a technical tolylene diisocyanate misture (80% b.w. of 2,4-isomer and 20% b.w. of 2,6-isomer) are used as the polyisocyanate. The foam formed has a density of the order of 220 kg/m$^3$, does not continue burning in the flame test and—foaming vigorously—forms the fire-repellent carbonizing foam.

EXAMPLE 18

The procedure is as in Example 16, except that a mixture of equal parts of melamine and dicyanodiamide is used instead of melamine and no water is added.

A flexible material resembling hard rubber with a density of the order of 650 kg/m$^3$ is obtained on the moving belt. 1 cm×3 cm strips are cut from the flexible material and are cemented into correspondingly dimensioned grooves cut into a door surround so that, when the door is closed, they are flush with the surface of the door frame and the opposite door panel. This measure protects the sample door frame against the penetration of fire and flame gases. The cemented-in strips of the intumescent material are not affected, for example, dislodged, by vibration of the type generated by repeated mechanical "door banging" or of the type encountered, for example in a motor vehicle, boat or aircraft. When the door surround is exposed to a flame, it is sealingly closed by the foaming intumescent material.

The intumescent material performs very well in the flame test. It undergoes an increase in volume of more than 200 to 300% and does not show any signs of afterburning.

EXAMPLE 19

The procedure is as in Example 16, except that no water is added. In this case, the reaction mixture formed in the mixing head is discharged by means of a jet of compressed air and sprayed onto a sand-blasted steel substrate on which it hardens in a few seconds to form a leather-like covering. An approximately 10 mm thick layer of material is formed on the substrate.

A sample of the covering thus-formed is stored under water for 18 days, subsequently rinsed with water and then dried. In the flame test, it shows intumescent properties as good as those of a sample which has not been stored under water. After storage for 10 days at 50° C., the steel substrate is exposed to a natural gas flame. An approximately 5 cm thick layer of fine-pored carbonizing foam is formed, protecting the underlying part of the substrate against an increase in temperature to above 450° C. for a period of more than 30 minutes.

EXAMPLE 20

A mixture is prepared from 24 parts of melamine (dm) 0.5 part of water, 14.5 parts of P-diol and 25 parts of an addition product of ethylene oxide with ethylene diamine having an OH-number of 399.

The mixture thus prepared is thoroughly stirred with 23 parts of isocyanate (a) and, as soon as homogeneity is obtained, is poured into a beaker mold. In the mold, the reaction mixture begins to foam after about 35 seconds. The foam is tack-free after about 70 seconds. The fine-pored material has a density of the order of 250 kg/m$^3$ and is soft and plastic in character. However it is slow to recover from the compression. When a test specimen is exposed to a flame as in Example 1, it foams vigorously but does not continue to burn after removal of the flame. Approximately 1 cm thick mats cut from this material are suitable for use as a fire-repellent intumescent antivibration lining and as an acoustic lining in motor vehicle construction.

EXAMPLE 21

A mixture is prepared from 24 parts of melamine (dm) 0.5 part of water, 12.5 parts of propyl according to Example 20, 12.5 parts of polyether (C1) and 14.5 parts of P-diol. The mixture thus prepared is mixed with 19 parts of polyisocyanate (2) in a nozzle-type mixing head and discharged onto a moving belt, the nozzle sweeping over the belt as it passes by in accordance with the laminator technique used for continuous sheet production. On the belt, the reaction mixture foams to form an approximately 5 cm thick foam mat (density approximately 200 kg/m$^3$). Compared with the previous Examples, this foamed intumescent composition is distinguished by its particular flexibility. Vigorous foaming is observed in the flame test without any signs of afterburning. If the water is left out of the formulation, a soft and porous rubber-like material having outstanding intumescent properties is obtained, performing equally well in the flame test.

EXAMPLE 22

The procedure is as in Example 1, except that the polyisocyanate (a) used is a polyisocyanate obtained in the same way as the polyisocyanate used in that Example, *but* with a polynuclear polyisocyanate content of the order of 20%.

An intumescent foam having a density of approximately 200 kg/m$^3$ is similarly obtained, although the foam cells are distinctly smaller than those of the foam obtained in accordance with Example 1. If the polynuclear polyisocyanate content is increased to 40%, there is no significant change in the cell structure.

In the flame test, the intumescent foams obtainable in this way foam vigorously and do not continue burning for more than 5 seconds. They are suitable for use as intumescent materials.

EXAMPLE 23

24 parts of melamine, 0.5 part of water, 25 parts of polyol (C1), 3.2 parts of tetraethylene glycol and 14.5 parts of P-diol are thoroughly mixed and the resulting mixture stirred with 25 parts of polyisocyanate (a). After about 30 seconds, the mixture foams to form an intumescent foam having properties corresponding to those of the material obtainable in accordance with Example 1.

EXAMPLE 24

The procedure is as in Example 23, except that 3.5 parts of ethylene glycol are used instead of tetraethylene glycol. The foam thus-formed is masticated in a kneader, forming a non-tacky plastic cement. In the flame test, the cement thus-formed undergoes an increase in volume to more than 300% and does not continue burning after removal of the flame. It may be used as an intumescent cement for filling gaps or cracks in masonary.

What is claimed is:
1. Intumescent compositions obtained by reacting
    (a) polyisocyanates,
    (b) phosphorous-containing condensation products having at least two hydroxyl groups, which are obtained by condensing primary or secondary, aliphatic, cycloaliphatic, aromatic, araliphatic or heterocyclic monoamines and/or polyamines optionally containing OH-groups, carbonyl compounds and dialkyl phosphites,
    (c) polyethers of average functionality greater than two and having average OH-numbers of from 150 to 500 which have been obtained by the addition of alkylene oxides, of which from 50 to 100% by weight consist of ethylene oxide, with low molecular weight starters,
(d) cyanuric acid and/or cyanuric acid derivatives, and
(e) optionally, water and/or other organic compounds containing isocyanate-reactive hydrogen atoms.

2. Intumescent compositions as claimed in claim 1, obtained by reacting from 15 to 55 parts by weight of a polyisocyanate (a) with 100 parts by weight of a mixture consisting of from 10 to 45% by weight of phosphorus-containing condensation products (b) having at least two hydroxyl groups, from 20 to 55% by weight of polyethers (c), from 10 to 60% by weight of cyanuric acid (derivatives) (d), and from 0 to 10% by weight of water and/or from 0 to 25% by weight of other organic compounds containing isocyanate-reactive hydrogen atoms.

3. Intumescent compositions as claimed in claim 1 characterized in that the polyisocyanates used are of the type obtained by condensing aniline with formaldehyde, followed by phosgenation.

4. Intumescent compositions as claimed in claim 3, characterized in that the condensation products containing at least two hydroxyl groups used are of the type which correspond to the following formula $$(RO)_2PO-CH_2-N=(CHX-CHX-OH)_2$$

in which
$R = C_1-C_8$-alkyl or $C_1-C_8$-hydroxy alkyl and
$X = H$ or methyl.

5. Intumescent compositions as claimed in claim 4, characterized in that addition products of ethylene oxide with trifunctional to tetrafunctional starters having OH-numbers of from 200 to 400 are used as the polyethers.

6. Intumescent compositions as claimed in claim 1 characterized in that melamine is used as the cyanuric acid derivative.

7. Intumescent compositions according to claim 1, characterized in that the compositions are foamed.

8. In a process for the production of moldings comprising forming reactable materials in molds, the improvement wherein the reactable materials comprise intumescent compositions according to claim 1.

9. In a process for the production of moldings comprising forming a fully-reacted reaction mixture, the improvement wherein said reaction mixture is an intumescent composition according to claim 1.